Feb. 9, 1960 W. SICHAK ET AL 2,924,703
COMMUNICATION CONTROL SYSTEM
Filed July 12, 1957
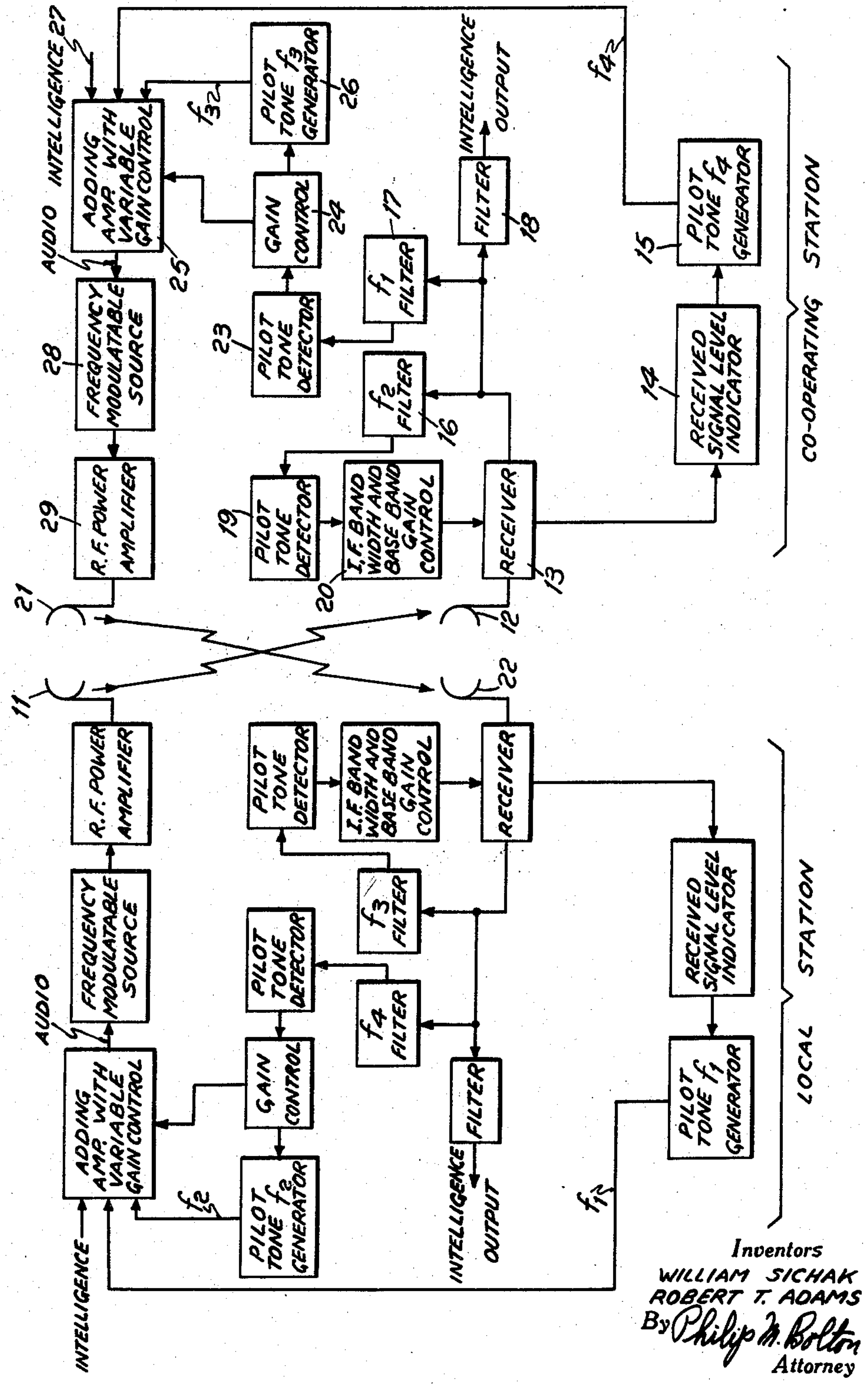
Inventors
WILLIAM SICHAK
ROBERT T. ADAMS
By Philip M. Bolton
Attorney

United States Patent Office 2,924,703

Patented Feb. 9, 1960

2,924,703

COMMUNICATION CONTROL SYSTEM

William Sichak, Nutley, and Robert T. Adams, Short Hills, N.J., assignors to International Telephone and Telegraph Corporation, Nutley, N.J., a corporation of Maryland Application July 12, 1957, Serial No. 671,467

8 Claims. (Cl. 250—6)

This invention relates to communication systems and in particular to a control arrangement for signal-noise ratio improvement for a two-way communication system.

In many communication systems using types of modulation having a threshold such as frequency modulation, phase modulation, and pulse-time modulation, it is possible to optimize the signal-noise ratio by adjusting the receiver bandwidth in accordance with the carrier-noise ratio under any particular signal transmission conditions.

For instance, it is well known that in a frequency modulation system, for a fixed deviation ratio or modulation index, there will be a decrease in the signal-noise ratio as the carrier-noise ratio decreases. This decrease in signal-noise ratio will be proportional to the carrier-noise ratio until the frequency modulation threshold value is reached beyond which point the signal-noise ratio decreases rapidly to zero. It is also well known that under conditions where the carrier-noise ratio is above the threshold value, if the receiver bandwidth is increased and the transmitter deviation ratio increased accordingly, there will be an "FM improvement." This "FM improvement" represents an increase in signal-noise ratio which is substantially greater than would have been possible had the receiver bandwidth and the transmitter deviation ratio remained fixed, with the communication system being made to rely on the normal proportional improvement at this fixed deviation ratio.

A more complete analysis of the problem has been presented by Murray G. Crosby in the April 1937, issue of the "Proceedings of the IRE," pages 472–514. The above-described relationship by the carrier-noise ratio, signal-noise ratio, and the threshold value can be readily seen by examining the theoretical graph on page 495 and the experimental graph on page 501 of Mr. Crosby's presentation.

In any type of communication system in which the signal-noise ratio can be improved by either increasing or decreasing the bandwidth of the receiver, it would be desirable to have an automatic control for matching the bandwidth of the receiver with the modulation, which in the case of a frequency modulation system is the frequency deviation, of the transmitter according to the carrier-noise ratio in order to obtain the best signal-noise ratio for particular conditions of signal transmission. It is also desirable in a two-way communication system to have such control arrangements operating continuously and independently for the two directions. For instance, if there were a low carrier-noise ratio for signals passing in a first direction compared with a high carrier-noise ratio for signals passing in the second direction of a two-way communication system, it would be desirable to match the first path's receiver and transmitter independently of the second path's receiver and transmitter combination. It also seems apparent that the desirability of such a system would be enhanced by providing "fail-safe" features wherein the control system would cause the signal transmission to function with a low deviation ratio unless positively directed to do otherwise.

It is therefore an object of the present invention to provide an improved signal-noise ratio control system.

It is another object of the present invention to provide an automatic, continually operating signal-noise ratio control system for a two-way communication system.

It is a further object in accordance with the second object to provide a control system which has "fail-safe" features.

It is still a further object of the present invention to provide a signal-noise ratio control arrangement for a two-way communication system wherein the signal-noise ratio control is independent for each of the signal transmission paths.

In accordance with the above objects a main feature of the invention provides two different control signal tone generators associated with a transceiver station, with one tone generated to indicate the carrier-noise ratio of signals received at the station, and the other tone generated to indicate the modulation, as in an FM system the frequency deviation, of the signal being transmitted from the station.

Another main feature of the present invention provides an RF receiver whose IF bandwidth is adjusted in accordance with a control signal transmitted from a cooperating station, with said control signal being indicative of the modulation, i.e., the frequency deviation in an FM system, of the signal transmitted from said cooperating station.

Another main feature of the present invention provides a modulating device to modulate the transmitted signal, i.e., alter the frequency deviation in an FM system, in accordance with a control signal received at the local station which is indicative of the carrier noise level of the signal received at a cooperating station.

The foregoing and other objects and features of this invention and the manner of attaining them will become more apparent and the invention itself will be best understood by reference to the following description of an embodiment of the invention taken in conjunction with the accompanying drawings comprising the figure, which is a block diagram of the system.

Referring in particular to the figure, there are two stations with one station being designated as the local station and the other as the cooperating station. The embodiment of the figure and the description of the operation of the system deals with a frequency modulation communication link; however, an analogous method can be worked out for any type of modulation in which signal-to-noise improvement can be obtained by adjusting the bandwidth. In the figure there is a transmitter 11 transmitting a signal to the cooperating station receiver antenna 12. These signals contain at least four elements, namely, some intelligence, a pilot tone $f_1$, a pilot tone $f_2$, and some noise. The system described herein is a system with four pilot tones which renders a complete and clean presentation although such a system could operate obviously with two pilot tones. With high frequency operations the noise level is considered to be constant so that an indication of the received signal level is equivalent to an indication of the carrier-noise ratio. The signals from 11 are received by the receiving antenna 12 and passed to a receiver device 13. The receiver 13 may be any well-known frequency modulation receiver. The signals are sampled by the received signal level indicator 14. The indicator 14 can be a well-known AGC circuit such as those described in the MIT Radiation Laboratory Series, published by McGraw Hill, 1948, specifically found in volume 23. Having obtained an indication of the received signal level, which as suggested above is representative of the carrier-noise ratio, a signal is sent to the pilot tone generator 15 to generate a pilot tone $f_4$, which is indicative (by its amplitude or by suitable other forms of modulation) of the level of the signal being received at 12 (transmitted from 11). Simultaneously with passing the received signal sampled to 14, the received signal is passed respectively to three filters, 16, 17, and 18. At filter 16 the pilot tone $f_2$ is separated. The pilot tone $f_2$, as will become apparent from the discussion below, indicates the frequency deviation of the signal transmitted from the transmitter 11. An object of the over-all control system is to adjust the receivers according to the frequency deviation or modulation of the signals being transmitted. Hence, $f_2$ being indicative of the frequency deviation is passed from the filter 16 to the pilot tone detector 19 and on to the IF bandwidth and base band gain control device 20. Obviously, the control circuit 20 could be incorporated in the receiver 13, but has been shown as a separate block for purposes of clarity. During this same period of time in which we have considered the generation of $f_4$ and the filtering of $f_2$, the filter 17 filters the control pilot tone $f_1$. The control pilot tone $f_1$ is the counterpart of $f_4$ for the local station. We know from our previous discussion that $f_4$ indicates carrier-noise ratio of the signals at the receiving point 12 (transmitted from 11), and it follows by observation that $f_1$ indicates the carrier-noise ratio of the received signals being received at 22 (from the transmitting antenna 21). If the carrier-noise ratio along the path from 11 to 12 as determined from $f_1$ is high, it behooves the cooperating station to increase the frequency deviation to attain the maximum possible "FM improvement." Consequently, $f_1$ is passed to the pilot tone detector 23, to the gain control 24 to cause the adding amplifier 25 to be adjusted to increase the audio signal amplitude, which represents the output of amplifier 25. Adding amplifier 25 may be of the type described in the text, "Electronic and Radio Engineering" by Terman, 4th edition, published by McGraw Hill, 1955. From the gain control device 24 there is passed a signal to the pilot tone generator 26 which varies the amplitude, frequency, or other modulation of this generator output $f_3$ to be indicative of the frequency deviation, which, it is clear, is directly related to the gain control of the amplifier 25. The audio signal from 25 contains the intelligence signal which appears at the input thereto 27, the control pilot tone $f_4$ and the control pilot tone $f_3$. The frequency modulatable source 28 is modulated by the audio signal and passes a frequency modulated RF signal to the RF power amplifier to be transmitted from 21. The source 28 can be a klystron oscillator circuit as described in the text by Terman, mentioned above.

The "fail-safe" feature of the invention can be introduced at the received signal level indicator 14. At this point the indicator 14 can employ a filter which will permit the system to merely sample the carrier-noise level of $f_2$, or preferably employ any well-known gating device so that the AGC signal at 14 is used, without the filter, but is passed only at such times as $f_2$ is present. It follows that if $f_2$ fails, for any reason, to be transmitted, the indicator 14 will indicate the lowest signal level within its range which in turn wll cause $f_4$ to adjust the transmitter at the local station for a small deviation transmission. It likewise follows that if $f_4$ fails, the signal transmitter of the local station will be adjusted for a small deviation transmission. Similarly $f_3$ and $f_1$ operate for the cooperating station. This operation renders the system "fail-safe," since in the event of a tone failure the system operates on the narrow band width receiver—small deviation transmitter matching, which will not necessarily accomplish the "FM improvement," but will insure that if the transmission conditions require this narrow bandwidth receiver—small deviation transmitter matching, the system will not be set for a wide bandwidth receiver—large deviation transmitter matching. The latter matching would render the system in the zero signal-noise level condition described above if the former matching were required.

The circuitry arrangement at the local station is symmetrical and analogous to the circitury described above in connection with the cooperating station. In view of the above discussion the operation of the circuitry at the local station can be followed without a further description.

In summation, the pilot tones $f_1$ and $f_2$, respectively, indicate the carrier-noise ratio of the signal received at the local station and the frequency deviation of the signal transmitted from the local station. Because of its indication characteristic, $f_1$ controls the frequency deviation of the transmitted signal at the cooperating station to effect the "FM improvement" when transmission conditions, i.e., carrier-noise ratio, warrant attaining this "FM improvement." The control signal $f_2$, on the other hand, controls the bandwidth adjustment of the receiver of the cooperating station to match the frequency deviation of the signals from the local station, which frequency deviation has been controlled by $f_3$ from the cooperating station in accordance with the received signal level at the cooperating station.

The closed loop operation of the four tones continually cause the communication link to compensate and correct automatically for optimum signal-noise ratio for any particular signal transmission conditions. It is clear from the description of the operation that each transmission path adjustment is independent of the other. In other words, if the carrier-noise ratio was low along the path from 11 to 12 and high along the path from 21 to 22, the frequency deviation and matching bandwidth adjustment described above would still maintain optimum signal-noise ratio for each path, independent of the other.

While we have described above the principles of our invention in connection with specific apparatus, it is to be clearly understood that this description is made only by way of example and not as a limitation to the scope of our invention as set forth in the objects thereof and in the accompanying claims.

We claim:

1. A control system for a transceiver for use in a two-way communication system comprising a cooperative station and a local station, said local station including a transmitter to transmit signals, a source of intelligence signals coupled to said transmitter, a receiver for receiving incoming signals including first and second control signals from said cooperative station, first and second means for respectively generating third and fourth control signals for control operations in said cooperative station, said first means responsive to the signal level at the output of said receiver to generate said third control signal indicative of the level of said received signals, means to add said third control signal to the signals to be transmitted from said transmitter, first and second signal sensitive means coupled to said receiver to separate respectively from said incoming signal said first and second control signals for control operations in said local station, said first signal being indicative of the modulation of said received signal, means to apply said first signal to said receiver to adjust said receiver to a matching bandwidth according to said first signal, said second signal indicative of the level of the signal being received by said cooperating station, means for applying said second control signal to vary the amplitude of the signals of said source of intelligence signal and hence the modulation of said transmitter in accordance with said second signal, means for applying said second control signal to said second means to vary said fourth control signal in accordance with the controlled modulation of said transmitter, and means to add said fourth control signal to the signals being transmitted from said transmitter.

2. A control system according to claim 1, wherein said first and second control signal generator means generate third and fourth pilot tones each respectively characterized by first and second frequency bands, and wherein said first and second control signals are pilot tones each respectively characterized by third and fourth frequency bands.

3. A control system according to claim 2, wherein said first and second signal sensitive means include first and second filters to respectively filter from said received signal said first and second control signals, and further include first and second control signal detectors respectively coupled to said first and second filters to detect said first and second control signals.

4. A control system according to claim 3, wherein the means to apply said first signal to said receiver includes an IF bandwidth and base band gain control means to effect said receiver adjustment.

5. A control system according to claim 1, wherein the means for applying said second control signal to vary the modulation includes a gain control device coupled to an audio signal amplifier device, and a signal modulatable source coupled between said amplifier and said transmitter.

6. A control system according to claim 5, wherein said signal modulatable source is a frequency modulatable source.

7. A control system according to claim 5, wherein the means for applying said second control signal to said fourth control signal generator includes said gain control device.

8. A control system for a two-way communication system, wherein there are first and second transceiver stations remotely located from each other, comprising first and second transmitters respectively associated with said first and second stations to transmit signals, a first and second source of intelligence signals coupled respectively to said first and second transmitters, first and second receivers respectively associattd with said first and second stations for receiving incoming signals, said first station having a first and second means for respectively generating first and second control signals for effecting control operations at said second station, said first means responsive to the output signal level of said first receiver to generate said first control signal indicating the level of the signals received from said second station, means to pass said first control signal to said first transmitter to be transmitted therefrom, said second control signal indicating the modulation of said transmitted signal, means to pass said second control signal to said first transmitter to be transmitted therefrom, said second station having a third and fourth means for respectively generating third and fourth control signals for respectively effecting control operations at said first station, said third means responsive to the output signal level of said second receiver to generate said third control signal indicating the level of the signals received from said first station, means to pass said third control signal to said second transmitter to be transmitted therefrom, said fourth control signal indicating the modulation of the signal transmitted from said second transmitter, means to pass said fourth control signal to said second transmitter to be transmitted therefrom, said first station further including first and second signal sensitive means coupled to said first receiver to separate respectively from said incoming signal said third and fourth control signals, means to apply said third signal to said first receiver to adjust said first receiver to a bandwidth matching the modulation of the signal from said second transmitter, means for applying said fourth control signal to vary the modulation of said first transmitter in accordance with said fourth signal indication, means for applying said fourth control signal to said second control signal generator to vary said second control signal in accordance with the controlled modulation of the signal transmitted from said first transmitter, said second station further including third and fourth signal sensitive means coupled to said second receiver to separate respectively from said incoming signal said first and second control signals, means to apply said second signal to said second receiver to adjust said second receiver to a bandwidth matching the modulation of the signal from said first transmitter, means for applying said first control signal to vary the modulation of said second transmitter in accordance with said first signal indication, and means for applying said first control signal to said third control signal generator to vary said third control signal in accordance with the controlled modulation of the signal transmitted from said second transmitter.

References Cited in the file of this patent

UNITED STATES PATENTS

| | | |
|---|---|---|
| 1,644,745 | Potter | Oct. 11, 1927 |
| 2,296,919 | Goldstine | Sept. 29, 1942 |
| 2,694,140 | Gilman et al. | Nov. 9, 1954 |